United States Patent
Sachidanandam et al.

(10) Patent No.: US 10,574,615 B2
(45) Date of Patent: Feb. 25, 2020

(54) HETEROGENEOUS CONTENT IN EMAIL INBOX

(71) Applicant: Microsoft Technology Licensing, LLC, Redmond, CA (US)

(72) Inventors: Vignesh Sachidanandam, Seattle, WA (US); Ned Bearer Friend, Seattle, WA (US); Peter Loren Engrav, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/696,344

(22) Filed: Sep. 6, 2017

(65) Prior Publication Data
US 2019/0075067 A1     Mar. 7, 2019

(51) Int. Cl.
*G06F 15/16*     (2006.01)
*H04L 12/58*     (2006.01)

(52) U.S. Cl.
CPC .............. *H04L 51/22* (2013.01); *H04L 51/06* (2013.01)

(58) Field of Classification Search
CPC ................................ H04L 51/22; H04L 51/06
See application file for complete search history.

(56) References Cited

U.S. PATENT DOCUMENTS

| | | |
|---|---|---|
| 7,783,645 B2 | 8/2010 | Hess et al. |
| 8,639,552 B1 | 1/2014 | Chen et al. |
| 2007/0192327 A1 | 8/2007 | Bodin et al. |
| 2011/0179060 A1 | 7/2011 | Chilakamarri et al. |
| 2012/0197728 A1 | 8/2012 | Luna et al. |
| 2013/0124605 A1 | 5/2013 | Klaka et al. |
| 2014/0237387 A1* | 8/2014 | Ryall .................... H04L 65/403 715/753 |

FOREIGN PATENT DOCUMENTS

| | | | |
|---|---|---|---|
| WO | 2017058680 A1 | 4/2017 | |
| WO | WO 2017/058680 A1 * | 4/2017 | |

OTHER PUBLICATIONS

Tech Specs—FloWare, May 1, 2017, XP055497377, URL: https://www.floware.com/tech-specs/.*
Tech Specs—FloWare, May 1, 2017, XP055497378, URL: https://www.floware.com/blog-1/2017/5/1how-i-use-flo.*

(Continued)

*Primary Examiner* — June Y Sison
*Assistant Examiner* — Dixon F Dabipi

(57) ABSTRACT

Aspects of the present disclosure relate to systems and methods for integrating first class objects with email messages in an email inbox of an email client. In one example, a request is sent via the email client for first class object data to one or more data sources, where each data source of the one or more data sources includes first class object data of a different first class object type. The first class object data may be received at the email client from the one or more data sources. One or more first class objects may be created from the first class object data for injecting into an email inbox of the email client. The email inbox including at least some of the one or more first class objects and a plurality of email messages may be rendered in a user interface to the email client.

20 Claims, 8 Drawing Sheets

(56) References Cited

OTHER PUBLICATIONS

"Tech Specs—FloWare", Retrieved from https://www.floware.com/tech-specs/, Retrieved on: Aug. 3, 2018, 7 Pages.
Michael, "How I use Flo—FloWare", Retrieved from https://www.floware.com/blog-1/2017/5/1/how-i-use-flo, May 1, 2017, 3 Pages.
"International Search Report and Written Opinion Issued in PCT Application No. PCT/US2018/037966", dated Aug. 16, 2018, 15 Pages.
"Beautiful & Intelligent Email App", https://sparkmailapp.com/, Retrieved on: Jun. 9, 2017, 18 pages.

* cited by examiner

HETEROGENEOUS CONTENT IN EMAIL INBOX

BACKGROUND

To stay up to date with data (e.g., tasks, meetings, social networks, events, communications) a variety of tools including communication tools, social networks, news providers, calendars, task lists, email messages, and the like are required. In this regard, current technology requires multiple data sources for interacting with, viewing, and accessing data associated with a user. As such, current technology for providing, processing, communicating, rendering up to date data may require an increased amount of computing resources.

Furthermore, conventional email technology (e.g., clients, systems, and applications) receives and processes email messages from an email server through SMTP for rendering in the email inbox. For example, an email inbox of conventional and standard email clients includes email messages received at the email client as an email message using conventional and standard email protocols and processing such as via mailbox, email server, and SMTP technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for integrating first class objects with email messages in an email inbox of an email client. In one example, a request is sent via the email client for first class object data to one or more data sources, where each data source of the one or more data sources includes first class object data of a different first class object type. The first class object data may be received at the email client from the one or more data sources. One or more first class objects may be created from the first class object data for injecting into an email inbox of the email client. The email inbox including at least some of the one or more first class objects and a plurality of email messages may be rendered in a user interface to the email client.

In another aspect, a method for integrating first class objects with email messages in an email inbox of an email client is presented. A request for first class object data may be sent via the email client to one or more data source. The first class object data may be received at the email client from the one or more data sources. One or more first class objects may be created from the first class object data for injecting into an email inbox of the email client. The email inbox including the one or more first class objects may be rendered in a user interface to the email client.

In yet another aspect, a method for ordering first class objects within an email inbox having email messages of an email client is presented. First class object data may be received at the email client from the one or more data sources. One or more first class objects may be created from the first class object data, where each first class object comprises a first class object type having first class object type metadata associated with the first class object. The first class object type metadata may be processed to determine one or more positions within an email inbox of the email client for injecting the one or more first class objects. The one or more first class objects may be injected into the one or more determined positions within the email inbox of the email client, where the email inbox is rendered in a user interface to the email client.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
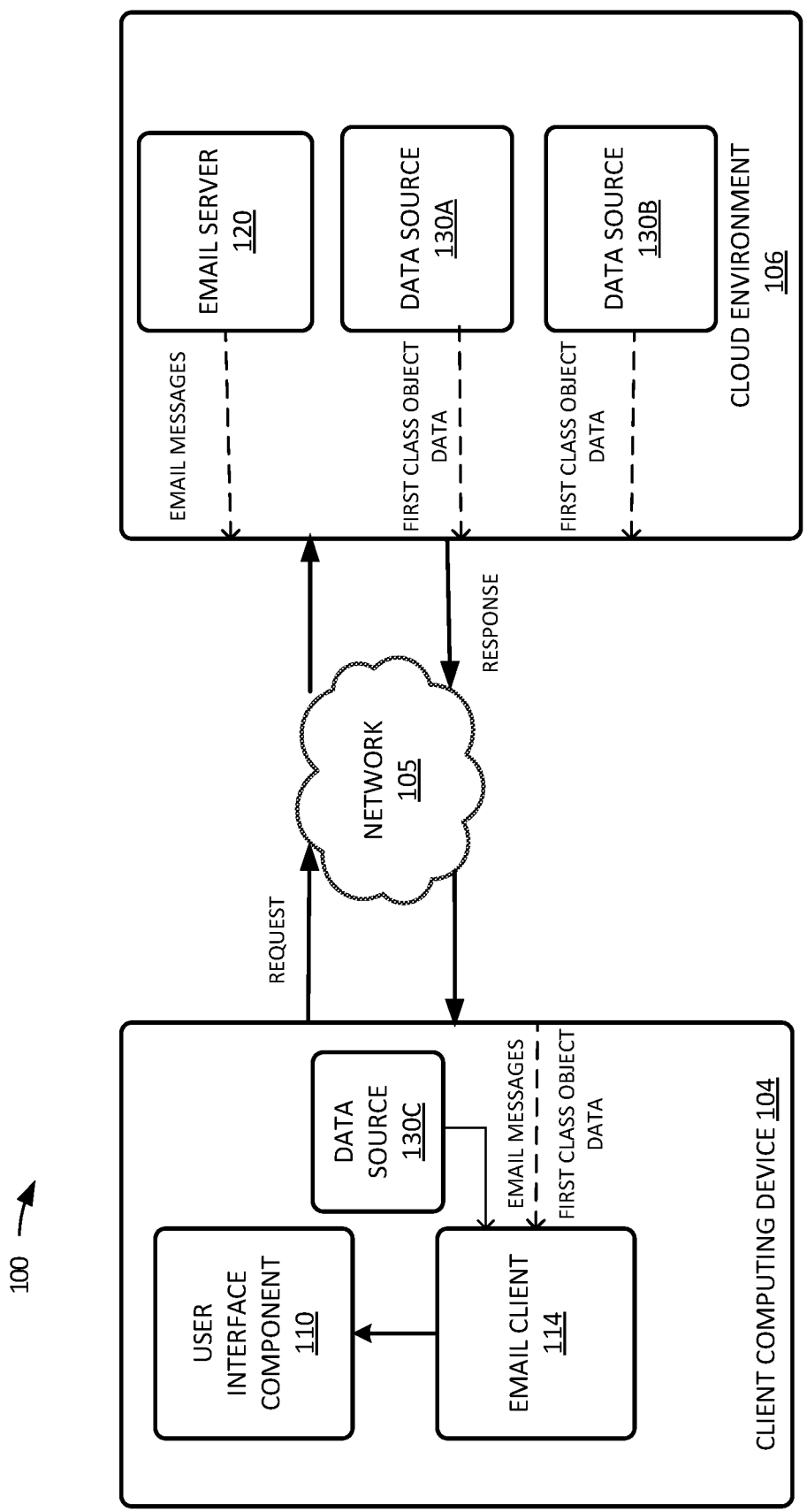
FIG. 1 illustrates an exemplary email system for integrating first class objects with email messages in an email inbox of an email client, according to an example aspect.

Aspects of the disclosure are generally directed to integrating first class objects with email messages in an email inbox of an email client. For example, as would be conventional and routine for an email client, an email client may receive email messages from an email server via SMTP. The email client may include these email messages in an email inbox. For example, the email client may render an email inbox including the email messages in a user interface to the email client. In another example, as would be unconventional and non-routine for an email client, an email client may receive first class object data from multiple data sources. In one example, the email client may call and/or execute an application programming interface for each data source that the email client receives first class object data from. In one example, the first class object data includes heterogeneous content such as suggested events, calendar events, tasks, to do lists, documents, people, notifications, reminders, notes, phone calls, chat history, third party content, browser tabs, search engine history, third party applications, and the like.

The email client may create one or more first class objects from the first class object data. For example, the email client may create a first class object from the suggested events first class object data. In this example, the first class object may include a created suggested event including what the suggested event is, the date and time of the suggested event, the location of the suggested event, a description of the suggested event, and the like. The suggested event (e.g., the first class object) may be injected into the email inbox of the email client. For example, the suggested event including the information described above may be inserted as an item, for example, into the stream of email messages in the email inbox. That is, the suggested event/item/first class object is not an email message (e.g., a message received from an email server through standard and conventional email technology). The email inbox including the one or more first class objects and email messages may be rendered in a user interface to the email client. As such, a technical effect that may be appreciated is that the email client is performing non-routine and unconventional steps and processes by receiving first class object data including heterogeneous content from multiple data sources, creating one or more first class objects from the first class object data for injecting into an email inbox of the email client, and rendering the email inbox including the one or more first class objects in a user interface to the email client.

As discussed above, to stay up to date with data (e.g., tasks, meetings, social networks, events, communications) a variety of tools including communication tools, social networks, news providers, calendars, task lists, email messages, and the like are required. In this regard, current technology requires multiple data sources for interacting with, viewing, and accessing data associated with a user. As such, current technology for providing, processing, communicating, rendering up to date data may require an increased amount of computing resources. Accordingly, as described herein, an email client may receive first class object data including heterogeneous content from multiple data sources, create one or more first class objects from the first class object data for injecting into an email inbox of the email client, and render the email inbox including the one or more first class objects in a user interface to the email client. In this regard, the email client may provide in the email inbox itself email messages and a variety of heterogenous content as first class objects and/or items. As such, the email client and/or email inbox may be a single tool for providing up to date and new data such as suggested events, calendar events, tasks, to do lists, documents, people, notifications, reminders, notes, phone calls, chat history, third party content, browser tabs, search engine history, third party applications, and the like. In this regard, another technical effect that may be appreciated is that by utilizing a single application (e.g., the email client) for providing up to date and new data from a variety of data sources associated with a user, less computing resources are utilized. For example, by only requiring the execution of a single application, at the very least, processor load may be reduced and memory may be conserved.

Furthermore, by utilizing a single application (e.g., the email client) for providing up to date and new data from a variety of data sources associated with a user, another technical effect that may be appreciated is that user interaction performance with the user interface is increased. For example, a user only needs to interact with the email client and/or the email inbox to view, access, interact with most, if not all, of the data associated with her. For example, a user is not required to open and initiate multiple instances of a browser, windows, and/or applications to access data from multiple data sources.

In another aspect, the first class objects may be positioned within the email inbox counterintuitively. For example, each first class object, as described herein, comprises a first class object type having first class object type metadata associated with the first class object. The first class object types may include suggested events, calendar events, tasks, to do lists, documents, people, notifications, reminders, notes, phone calls, chat history, third party content, browser tabs, search engine history, third party applications, and the like. The first class object type metadata may include a last modified time, a due date, an event start date, a recurring date, a complete date, a time estimate, an activity date, and the like. In one example, the first class object type metadata may include metadata associated with the first class object, but retrieved from a source external to the first class object. In another example, the first class object type metadata may be retrieved and part of the first class object itself. The first class object type metadata may be processed to determine one or more positions within the email inbox of the email client for injecting the one or more first class objects. For example, for one first class object type, it may be determined that a first class object of that type is injected into a position within the email inbox based on a due date of the first class object. In another example, for another first class object type, it may be determined that the first class object of that type is injected into a position within the email inbox based on an activity date of the first class object. The one or more first class objects may be injected into the one or more determined positions within the email inbox of the email client. In this regard, another technical effect that may be appreciated is that the first class objects are ordered and positioned in the email inbox in a counterintuitive, unconventional and non-routine manner.

Referring now to the drawings, in which like numerals represent like elements through the several figures, aspects of the present disclosure and the exemplary operating environment will be described. With reference to FIG. 1, one aspect of an email system 100 for integrating first class objects with email messages in an email inbox of an email client is illustrated. The email system 100 may include a client computing device 104 and a cloud environment 106. In aspects, the email system 100 may be implemented on the client computing device 104. In a basic configuration, the client computing device 104 is a handheld computer having both input elements and output elements. The client computing device 104 may be any suitable computing device for implementing the email system 100 for integrating first class objects with email messages in an email inbox of an email client. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the email system 100 for integrating first class objects with email messages in an email inbox of an email client may be utilized.

In aspects, the email system 100 may be implemented in the cloud environment 106. The cloud environment 106 may provide data to and from the client computing device 104 through a network 105. In aspects, the email system 100 may be implemented in more than one cloud environment 106, such as a plurality of cloud environments 106. As discussed above, the cloud environment 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the email system 100 may be implemented as a web-based application. In one example, the web-based application may include any client-server software application where the client (e.g., user interface) runs in a web-browser and/or any component capable of rendering HTML, Flash, Silverlight, and the like.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The various components may be implemented using hardware, software, or a combination of hardware and software. In aspects, the client computing device 104 may include a user interface component 110, an email client 114, and at least one data source 130C. The user interface component 110 may facilitate interaction with the email client 114 and/or access to data. For example, the user interface component 110 may display and/or render a navigation pane, a reading pane, an email inbox, a header, and a variety of data, for example as discussed herein, in the email client 114. The email client 114 may include any email application configured to read, access, and manage email messages such as Outlook, Mozilla, Thunderbird, Mail, and the like. In one example, the email client 114 may send a request for first class object data to one or more data sources. For example, the email client 114 may send a request for first class object data to the data source 130C. The data source 130C may be configured to store, manage, and access data and/or information associated with the email system 100. For example, the data source 130C may store one or more documents, files, chat conversations, suggested events, calendar events, tasks, to do lists, documents, people, notifications, reminders, notes, phone calls, chat history, third party content, browser tabs, search engine history, third party applications, and the like In another example, the email client 114 may send a request for first class object data to the cloud environment 106. As illustrated in FIG. 1, the cloud environment 106 may include an email server 120, a first data source 130A and a second data source 130B. As such, the email client 114 may send a request for first class object data to the first data source 130A and/or the second data source 130B. The first data source 130A and the second data source 130B may be configured to store, manage, and access data and/or information associated with the email system 100. For example, the first data source 130A and the second data source 130B may store one or more documents, files, chat conversations, suggested events, calendar events, tasks, to do lists, documents, people, notifications, reminders, notes, phone calls, chat history, third party content, browser tabs, search engine history, third party applications, and the like. In one example, the first data source 130A and the second data source 130B may include data sources such as OneDrive, Skype, Sharepoint, and the like. The request for first class object data may be sent through a different application programming interface (API) for each data source (e.g., data source 130A, data source 130B). For example, the email client may call and/or execute an API associated with the first data source 130A to request first class object data from the first data source 130A. In another example, the email client may call and/or execute an API associated with the second data source 130B to request first class object data from the second data source 130B.

In another example, the email client 114 may receive email messages from the email server 120. In one example, the email server 120 may include any email server capable of sending and receiving email messages such as an Exchange Server. The email client 114 may receive email messages via simple mail transfer protocol (SMTP) from the email server 120. In another example, the email client 114 may receive the first class object data from one or more data sources (e.g., data source 130A, data source 130B and data source 130C). In one example, the email client 114 may receive the first class object data through a different application programming interface for each data source (e.g., data source 130A, data source 130B) of the one or more data sources. In one example, the first class object data comprises heterogeneous content such as suggested events, calendar events, tasks, to do lists, documents, people, notifications, reminders, notes, phone calls, chat history, third party content, browser tabs, search engine history, third party applications, and the like. A suggested event may include an event suggested by the email system 100 based on determining an interest associated with a user of email client 114. For example, the email system 100 may determine that a user is interested in a sports team and suggest a sports game event for the user to attend. In another example, a suggested event may be based on a recurring event attended by the user. For example, a user may go to the gym every Tuesday and Thursday. As such, when the email system 100 determines that the user missed the gym one day, the email client 114 may suggest a gym event (e.g., an exercise class) for the following day, week, etc.

A calendar event may include an event and/or item scheduled in a calendar application of a user. A task may include a commitment, a request, a follow-up, an assignment, and the like that a user is expected to complete. The task may be identified in an email, a calendar application, a to-do list, and the like. A to-do list may include a list of items to be completed by a user associated with the email client 114. A document may include any file associated with a user of the email client 114. For example, a document may include a word document, a spreadsheet, an electronic slide presentation, an email, a chat conversation, and the like. People may include any person associated with a user of the email client 114. In one example, notifications may include an email based notification. In another example, notifications may include a device notification (e.g., a notification associated with the client computing device 104). Reminders may include reminders associated with scheduled events, calendar items, tasks, items on a to-do list. Phone calls may include Skype calls, video calls, meetings, missed calls, and the like. Chat history may include communication such as Skype messages, Instant Messages, and the like. Third party content may include web browser tabs, third party applications activity and/or data, and the like.

In one example, each data source of the one or more data sources (e.g., data source 130A, data source 130B, and data source 130C) includes first class object data of a different first class object type. For example, as discussed herein, the first class object data includes heterogeneous content. Each type of heterogeneous content is a first class object type. For example, the first class object types may include a suggested event, a calendar event, a task, a to do, a document, a person, a notification, a reminder, a note, a phone call, a chat history, third party content, a browser tab, a search engine history, and a third party application. In another example, one or more the data sources (e.g., data source 130A, data source 130B, and data source 130C) may include first class object data of the same first class object type.

In some examples, each first class object type of the plurality of first class object types discussed herein includes a content type command. For example, the content type command may be a command for initiating an action associated with the first class object type. In one example, when the first class object type is a document, the content type command may include a command for opening the document. In another example, when the first class object type is a person, the content type command may include a command to call the person. In other examples, each first class object type of the plurality of object types discussed herein may include a content type visualization. For example, when the first class object type is a document, the content type visualization may include a preview of the document. In another example, when the first class object type is a person, the content type visualization may include a social network update.

In other examples, the email client 114 may create one or more first class objects from the first class object data (e.g., the first class object data received from the one or more data sources) for injecting into an email inbox of the email client 114. In one example, each first class object of the one or more first class objects comprises a first class object type from a plurality of first class object types. For example, the first class object may be of the first class object type "task". In this example, the first class object is a task. The one or more first class objects may include a common command set. For example, the common command set may include the commands "Do", "Defer", and "Done". In one example, the "Do" command may include a command for initiating an action on the item (e.g., the first class object). For example, when the first class object/item is a document with more than one editor, the "Do" command may initiate a conversation on the document. The "Defer" command may include a command for modifying an item/first class object in the email inbox. For example, the "Defer" command may move an item/first class object in the email inbox to a different position (e.g., a time slot) within the email inbox. The "Done" command may include a command for marking an item/first class object as complete. In one example, the "Done" command may initiate an option for providing feedback.

In some examples, the email client 114 and/or the user interface component 110 may be configured to render the email inbox including at least some of the one or more first class objects and a plurality of email messages in a user interface to the email client 114. In this regard, the email inbox includes the plurality of email messages and the one or more injected first class objects. The plurality of email messages and the one or more injected first class objects may be ordered in any manner. For example, the email messages may be ordered using standard and conventional email message techniques such as by date, to, from, subject, and the like. In another example, the one or more injected first class objects may be ordered based on first class object type metadata. For example, the email client 114 may process the first class object type metadata to determine one or more positions within the email inbox of the email client 114 for injecting the one or more first class objects. The first class object type metadata may include at least one of a last modified time, a due date, an event start date, a recurring date, a complete date, a time estimate, and an activity date.

In one example, email client 114 may be part of and/or located in the cloud environment 106. In another example, the email client 114 may be part of and/or located at the first data source 130A and/or the second data source 130B. In one example, the first data source 130A and the second data source 130B may be part of and/or located at the client computing device 104. In another example, the data source 130C may be part of and/or located in the cloud environment 106. It is appreciated that although one cloud environment 106 is illustrated in FIG. 1, the email system 100 may include a plurality of cloud environments 106 with a plurality of data sources (e.g., data source 130A and data source 130B) and a plurality of email servers 120. In some cases, the cloud environment 106 may include a plurality of data sources (e.g., data source 130A and data source 130B) and a plurality of email servers 120. It is appreciated that although data source 130A, data source 130B, and data source 130C are illustrated in FIG. 1, the email system 100 may include any number of data sources including first class object data of any number of first class object types.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

Figure 2:
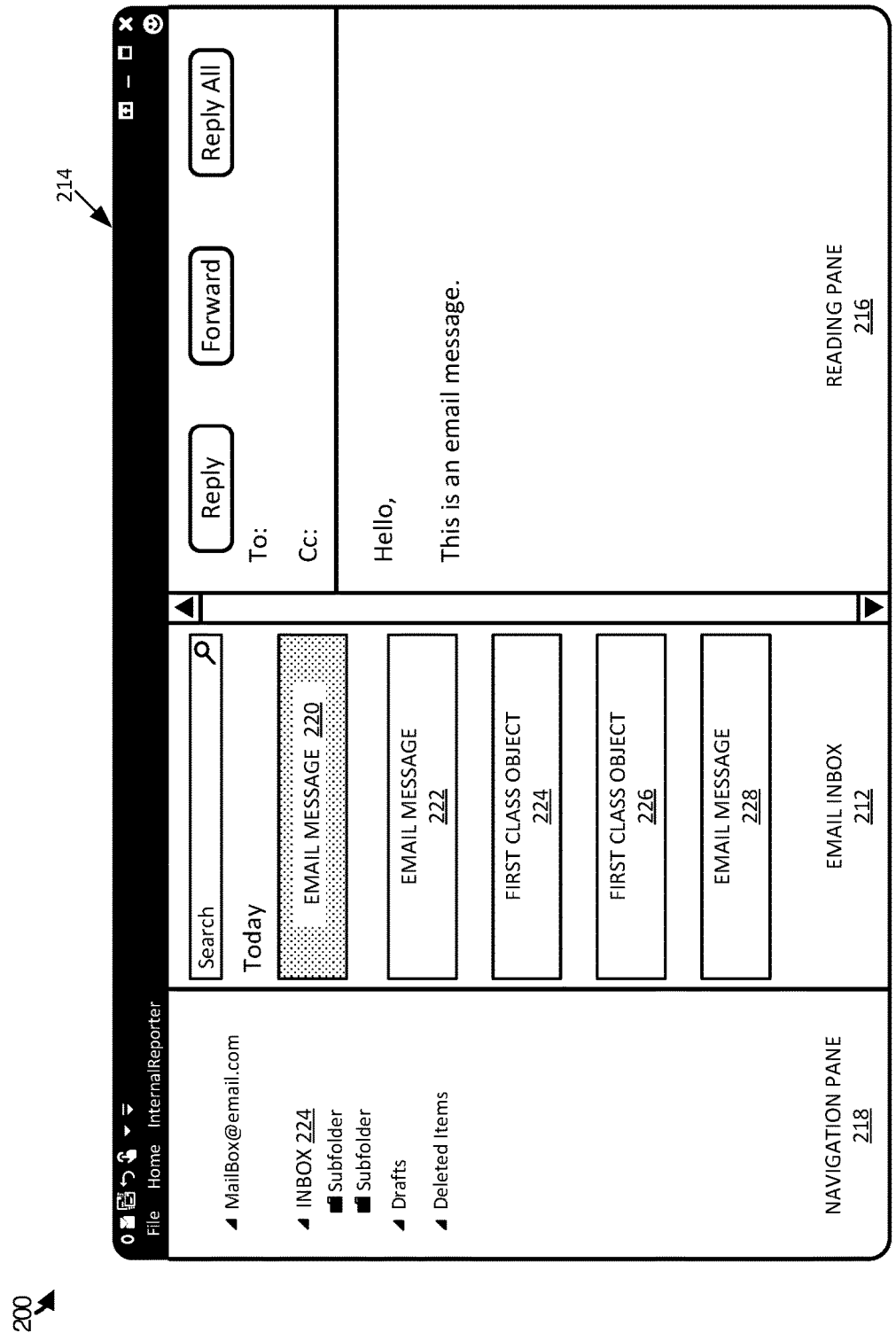
FIG. 2 illustrates one view of an email client, according to an example aspect.

With reference now to FIG. 2, one view 214 of an email client 200 is illustrated. Email client 200 may be any application or collection of applications, module or collection of modules, service or services, or any variation or combination thereof capable of facilitating sharing of content, communication, collaboration, conversations, and the like. Examples of the email client 200 include Microsoft® Outlook®, Outlook® Web App, Mobile Outlook®, Hotmail®, Outlook.com, and Gmail, as well as any other email client and/or email application. In aspects, the view 214 of the email client 200 is one example of a view a user may encounter when interacting with the email client 200. In one example, the view 214 may include a navigation pane 218, an email inbox 212, and a reading pane 216. The various components described herein may be implemented using hardware, software, or a combination of hardware and software. The navigation pane 218 includes contents and options for activating various modules, services, and/or applications that are part of the email client 200. For example, the navigation pane 218 may include options for activating mail, calendars, tasks, contacts, notes, folders, and the like. In one example, the navigation pane 218 may include a plurality of folders. As illustrated in FIG. 2, the navigation pane 218 includes an inbox folder 224 among other folders. In some cases, the inbox folder 224 may include subfolders.

In one case, when the inbox folder 224 is selected, a plurality of messages associated with the inbox folder 224 may be rendered and displayed within the email inbox 212 of the email client 200. In one example, the email inbox 212 includes at least one email message and at least one first class object. In the example illustrated in FIG. 2, the email inbox 212 includes email message 220, email message 222, email message 228, first class object 224 and first class object 226. As such, as illustrated in FIG. 2, the email inbox 212 includes one or more first class objects (e.g., first class object 224 and first class object 226) and a plurality of email messages (e.g., email message 220, email message 222, and email message 228) in a user interface to the email client 200. It is appreciated that the first class object 224 and the first class object 226 are created from first class object data as described herein and may be of any first class object types as described herein.

In one case, when the email message 220 is selected (as illustrated), contents associated with the selected email message 220 may be displayed in the reading pane 216. In this regard, the reading pane 216 may include contents associated with a selected message from the plurality of messages in the email inbox 212. When the message selected in the email inbox 212 is an email message, the contents displayed in the reading pane 216 include conventional email message contents, as illustrated.

Figure 3A:
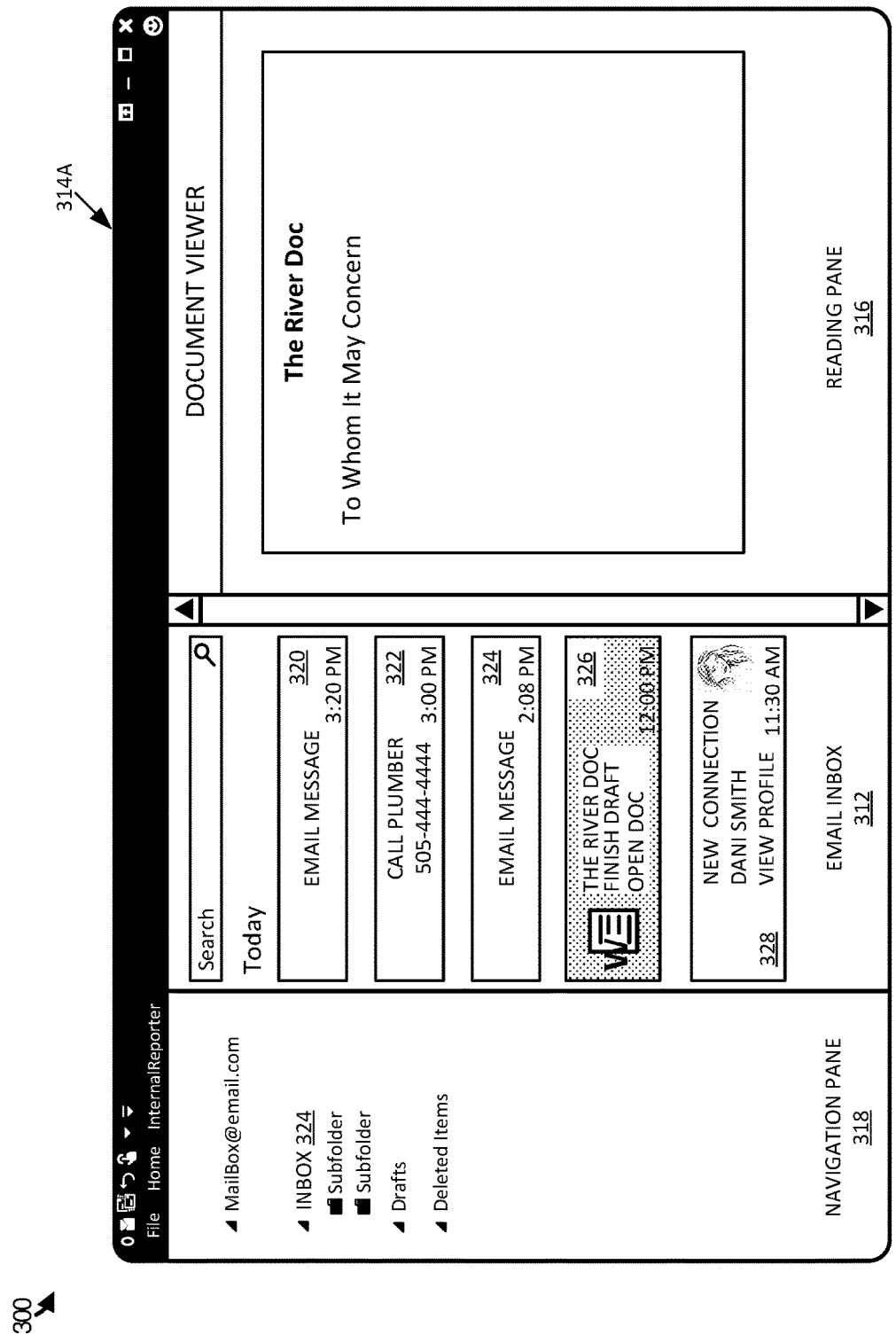
FIG. 3A illustrates one view in a progression of view of an email client, according to an example aspect.

Referring now to FIG. 3A, one view 314A in a progression of views of an email client 300 is shown. Similar to email client 200, email client 300 may be any application or collection of applications, module or collection of modules, service or services, or any variation or combination thereof capable of facilitating sharing of content, communication, collaboration, conversations, and the like. The view 314A of the email client 300 is an example of a view a user may encounter when interacting with the email client 300. In one example, the view 314A may include a navigation pane 318, an email inbox 312, and a reading pane 316. The various components described herein may be implemented using hardware, software, or a combination of hardware and software. The navigation pane 318 includes contents and options for activating various modules, services, and/or applications that are part of the email client 300. For example, the navigation pane 318 may include options for activating mail, calendars, tasks, contacts, notes, folders, and the like. In one example, the navigation pane 318 may include a plurality of folders. As illustrated in FIG. 3A, the navigation pane 318 includes an inbox folder 324 among other folders. In some cases, the inbox folder 324 may include subfolders.

In one example, the email inbox 312 includes one or more email messages and one or more first class objects. In the example illustrated in FIG. 3A, the email inbox 312 includes email message 320, first class object 322, email message 324, first class object 326 and first class object 328. In the example illustrated in FIG. 3A, the first class object 322 is of the first class object type "task". For example, the task is to call the plumber. The first class object of the first class object type "task" may be positioned in the email inbox 312 based on at least one of a last modified time, a due date, an event start date, a recurring date, a complete date, a time estimate, and an activity date. In this example, the task is positioned within the email inbox 312 based on the due date. As illustrated in FIG. 3A, the due date for calling the plumber is 3 pm and the first class object 322 (e.g., the task) is positioned above the email message 324 received at 2:08 pm and below the email message 320 received at 3:20 pm. While FIG. 3A illustrates positioning the first class object 322 within the email inbox 312 based on the due date of the task, it is appreciated that the first class object 322 may be positioned within the email inbox 312 based on processing the first class object type metadata such as a last modified time, a due date, an event start date, a recurring date, a complete date, a time estimate, and an activity date associated with the first class object 322.

In the example illustrated in FIG. 3A, the first class object 326 is of the first class object type "document". For example, the document is a word document. The first class object of the first class object type "document" may be positioned in the email inbox 312 based on at least one of a last modified time, a due date, an event start date, a recurring date, a complete date, a time estimate, and an activity date. In this example, the document is positioned within the email inbox 312 based on the due date. As illustrated in FIG. 3A, the due date is the due date for finishing a draft of the document. The due date for finishing the draft is 12 pm and the first class object 326 (e.g., the document) is positioned below the email message 324 received at 2:08 pm and above the first class object 328 having a time stamp of 11:30 am.

As illustrated in FIG. 3A, the first class object 326 includes the content type command "open doc". In this regard, in response to receiving a selection of the content type command "open doc", a reading pane version of the first class object 326 (e.g., a document) is rendered in the user interface to the email client 300. In this example, the reading pane version of the first class object 326 includes a document view. As such, a document view is opened in the reading pane 316. In turn, the document may be viewed in the reading pane 316. While FIG. 3A illustrates positioning the first class object 326 within the email inbox 312 based on the due date associated with the document, it is appreciated that the first class object 326 may be positioned within the email inbox 312 based on processing the first class object type metadata such as a last modified time, a due date, an event start date, a recurring date, a complete date, a time estimate, and an activity date associated with the first class object 326.

In the example illustrated in FIG. 3A, the first class object 328 is of the first class object type "people". For example, the person is a new connection Dani Smith. The first class object of the first class object type "people" may be positioned in the email inbox 312 based on at least one of a last modified time, a due date, an event start date, a recurring date, a complete date, a time estimate, a time estimate, and an activity date. In this example, the new connection is positioned within the email inbox 312 based on an activity date. For example, the new connection Dani Smith may be a person the user met at an event a week ago and the new connection is positioned within the email inbox 312 today to remind the user to touch base with the new connection Dani Smith.

Figure 3B:
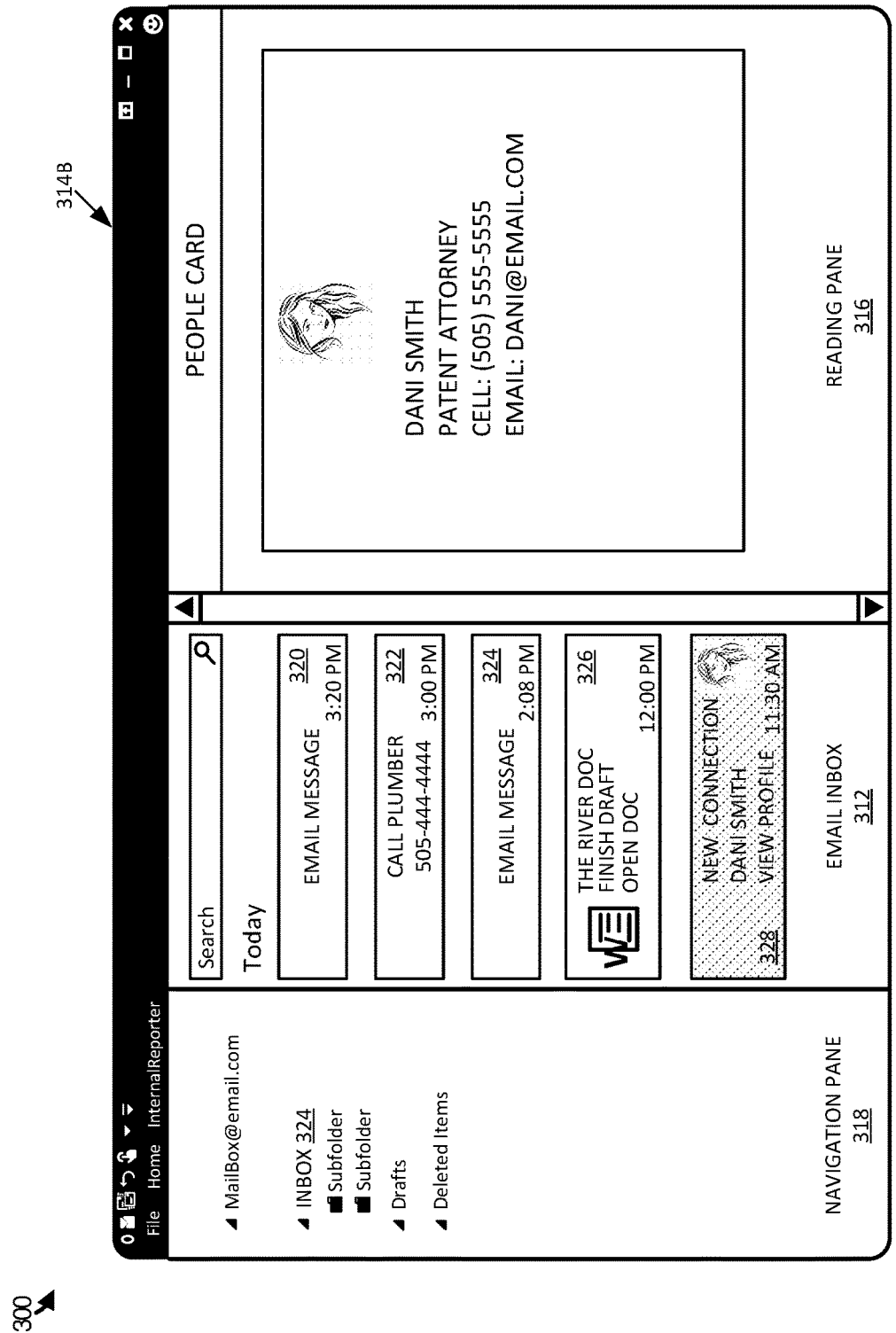
FIG. 3B illustrates another view in the progression of views of the email client of FIG. 3A, according to an example aspect.

Referring now to FIG. 3B, another view 314B in a progression of views of the email client 300 is shown. Similar to email client 200, email client 300 may be any application or collection of applications, module or collection of modules, service or services, or any variation or combination thereof capable of facilitating sharing of content, communication, collaboration, conversations, and the like. The view 314B of the email client 300 is an example of a view a user may encounter when interacting with the email client 300. In one example, the view 314B may include a navigation pane 318, an email inbox 312, and a reading pane 316. The various components described herein may be implemented using hardware, software, or a combination of hardware and software. The navigation pane 318 includes contents and options for activating various modules, services, and/or applications that are part of the email client 300. For example, the navigation pane 318 may include options for activating mail, calendars, tasks, contacts, notes, folders, and the like. In one example, the navigation pane 318 may include a plurality of folders. As illustrated in FIG. 3B, the navigation pane 318 includes an inbox folder 324 among other folders. In some cases, the inbox folder 324 may include subfolders.

In one example, the email inbox 312 includes one or more email messages and one or more first class objects. In the example illustrated in FIG. 3B, the email inbox 312 includes email message 320, first class object 322, email message 324, first class object 326 and first class object 328. In the example illustrated in FIG. 3B, the first class object 322 is of the first class object type "task". For example, the task is to call the plumber. The first class object of the first class object type "task" may be positioned in the email inbox 312 based on at least one of a last modified time, a due date, an event start date, a recurring date, a complete date, a time estimate, and an activity date. In this example, the task is positioned within the email inbox 312 based on the due date. As illustrated in FIG. 3B, the due date for calling the plumber is 3 pm and the first class object 322 (e.g., the task) is positioned above the email message 324 received at 2:08 pm and below the email message 320 received at 3:20 pm. While FIG. 3B illustrates positioning the first class object 322 within the email inbox 312 based on the due date of the task, it is appreciated that the first class object 322 may be positioned within the email inbox 312 based on processing the first class object type metadata such as a last modified time, a due date, an event start date, a recurring date, a complete date, a time estimate, and an activity date associated with the first class object 322.

In the example illustrated in FIG. 3B, the first class object 326 is of the first class object type "document". For example, the document is a word document. The first class object of the first class object type "document" may be positioned in the email inbox 312 based on at least one of a last modified time, a due date, an event start date, a recurring date, a complete date, a time estimate, and an activity date. In this example, the document is positioned within the email inbox 312 based on the due date. As illustrated in FIG. 3B, the due date is the due date for finishing a draft of the document. The due date for finishing the draft is 12 pm and the first class object 326 (e.g., the document) is positioned below the email message 324 received at 2:08 pm and above the first class object 328 having a time stamp of 11:30 am.

In the example illustrated in FIG. 3B, the first class object 328 is of the first class object type "people". For example, the person is a new connection Dani Smith. The first class object of the first class object type "people" may be positioned in the email inbox 312 based on at least one of a last modified time, a due date, an event start date, a recurring date, a complete date, a time estimate, and an activity date. In this example, the new connection is positioned within the email inbox 312 based on an activity date. For example, the new connection Dani Smith may be a person the user met at an event a week ago, and the new connection is positioned within the email inbox 312 today to remind the user to touch base with the new connection Dani Smith.

As illustrated in FIG. 3B, the first class object 328 includes the content type command "view profile". In this regard, as illustrated in FIG. 3B, in response to receiving a selection of the content type command "view profile", a reading pane version of the first class object 328 (e.g., a person) is rendered in the user interface to the email client 300. In this example, the reading pane version of the first class object 328 includes a people contact card. As such, a people contact card is opened in the reading pane 316. As such, the contact and associated information may be viewed in the reading pane 316. While FIG. 3B illustrates positioning the first class object 328 within the email inbox 312 based on an activity date, it is appreciated that the first class object 328 may be positioned within the email inbox 312 based on processing the first class object type metadata such as a last modified time, a due date, an event start date, a recurring date, a complete date, a time estimate, and an activity date associated with the first class object 328.

Figure 4:
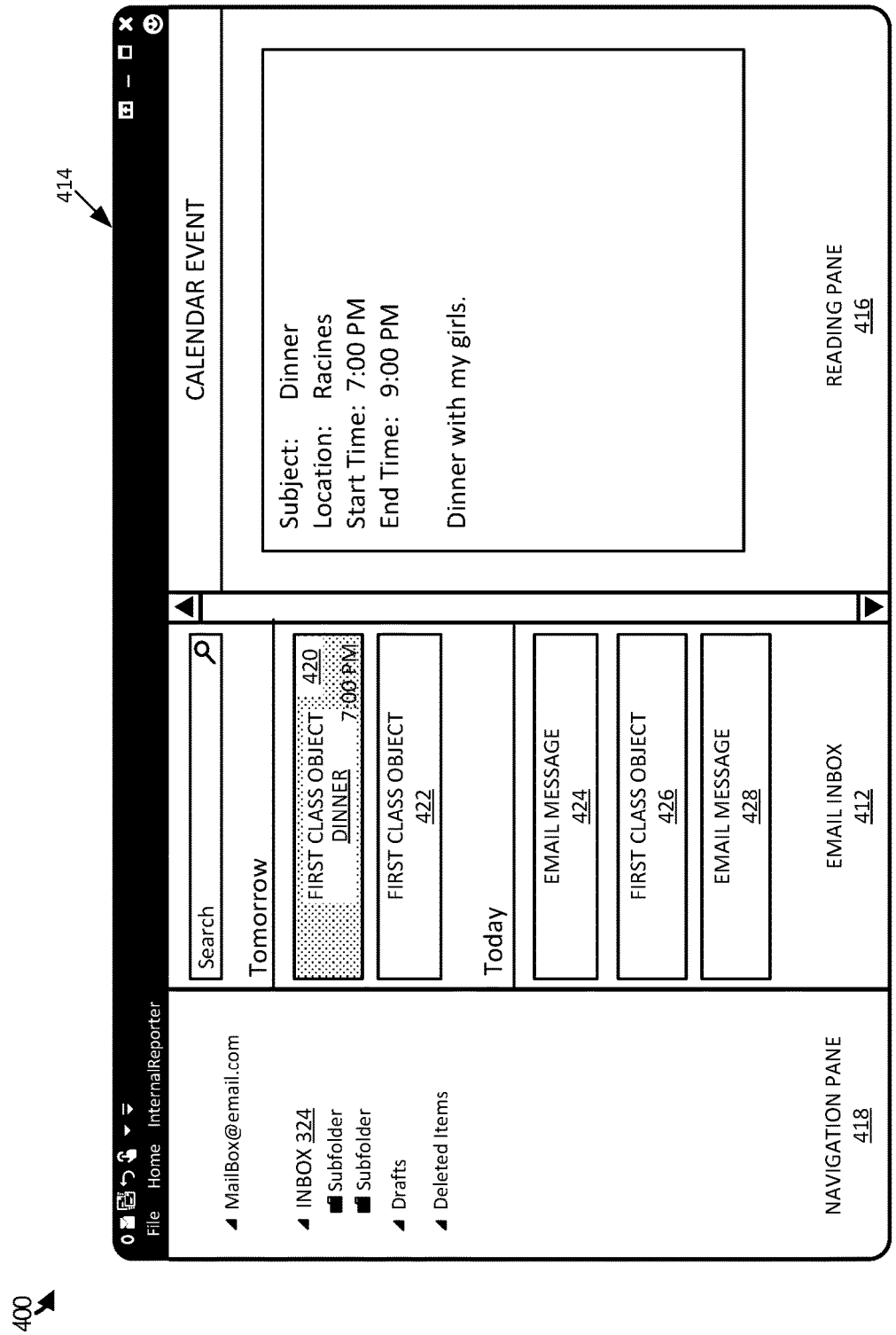
FIG. 4 illustrates one view of an email client, according to an example aspect.

Referring now to FIG. 4, one view 414 of an email client 400 is shown. Similar to email client 200 and email client 300, email client 400 may be any application or collection of applications, module or collection of modules, service or services, or any variation or combination thereof capable of facilitating sharing of content, communication, collaboration, conversations, and the like. The view 414 of the email client 400 is an example of a view a user may encounter when interacting with the email client 400. In one example, the view 414 may include a navigation pane 418, an email inbox 412, and a reading pane 416. The various components described herein may be implemented using hardware, software, or a combination of hardware and software. The navigation pane 418 includes contents and options for activating various modules, services, and/or applications that are part of the email client 400. For example, the navigation pane 418 may include options for activating mail, calendars, tasks, contacts, notes, folders, and the like. In one example, the navigation pane 418 may include a plurality of folders. As illustrated in FIG. 4, the navigation pane 418 includes an inbox folder 424 among other folders. In some cases, the inbox folder 424 may include subfolders.

In one example, the email inbox 412 includes one or more email messages and one or more first class objects. In the example illustrated in FIG. 4, the email inbox 412 includes first class object 420, first class object 422, email message 424, first class object 426 and email message 428. In the example illustrated in FIG. 4, the first class object 420 is of the first class object type "calendar event". For example, the calendar event is a scheduled dinner. The first class object of the first class object type "calendar event" may be positioned in the email inbox 412 based on at least one of a last modified time, a due date, an event start date, a recurring date, a complete date, a time estimate, and an activity date.

In this example, the calendar event is positioned within the email inbox 412 based on the event start date. As illustrated in FIG. 4, the start date for the dinner event is 7 pm tomorrow and the first class object 420 (e.g., the calendar event) is positioned in the future (e.g., tomorrow) within the email inbox 412. In this regard, the email inbox 412 may include one or more first class objects at a future time slot/position. As such, a user may quickly and easily identify future messages, items, events, tasks, and the like, in the email inbox 412. While FIG. 4 illustrates positioning the first class object 420 within the email inbox 412 based on the event start date of the calendar event, it is appreciated that the first class object 420 may be positioned within the email inbox 412 based on processing the first class object type metadata such as a last modified time, a due date, an event start date, a recurring date, a complete date, a time estimate, and an activity date associated with the first class object 420.

As illustrated in FIG. 4, the first class object 420 includes the content type command "dinner". In this regard, in response to receiving a selection of the content type command "dinner", a reading pane version of the first class object 420 (e.g., a calendar event) is rendered in the user interface to the email client 400. In this example, the reading pane version of the first class object 400 includes a calendar event view. As such, a calendar event view is opened in the reading pane 416. In turn, the calendar event and associated information may be viewed in the reading pane 416. In one example, a calendar associated with the email client 400 may include one or more first class objects, as described herein. For example, an email client (e.g., the email client 400) may receive first class object data including heterogeneous content from multiple data sources, create one or more first class objects from the first class object data for injecting into a calendar of the email client, and render the calendar including the one or more first class objects in a user interface to the email client.

Figure 5:
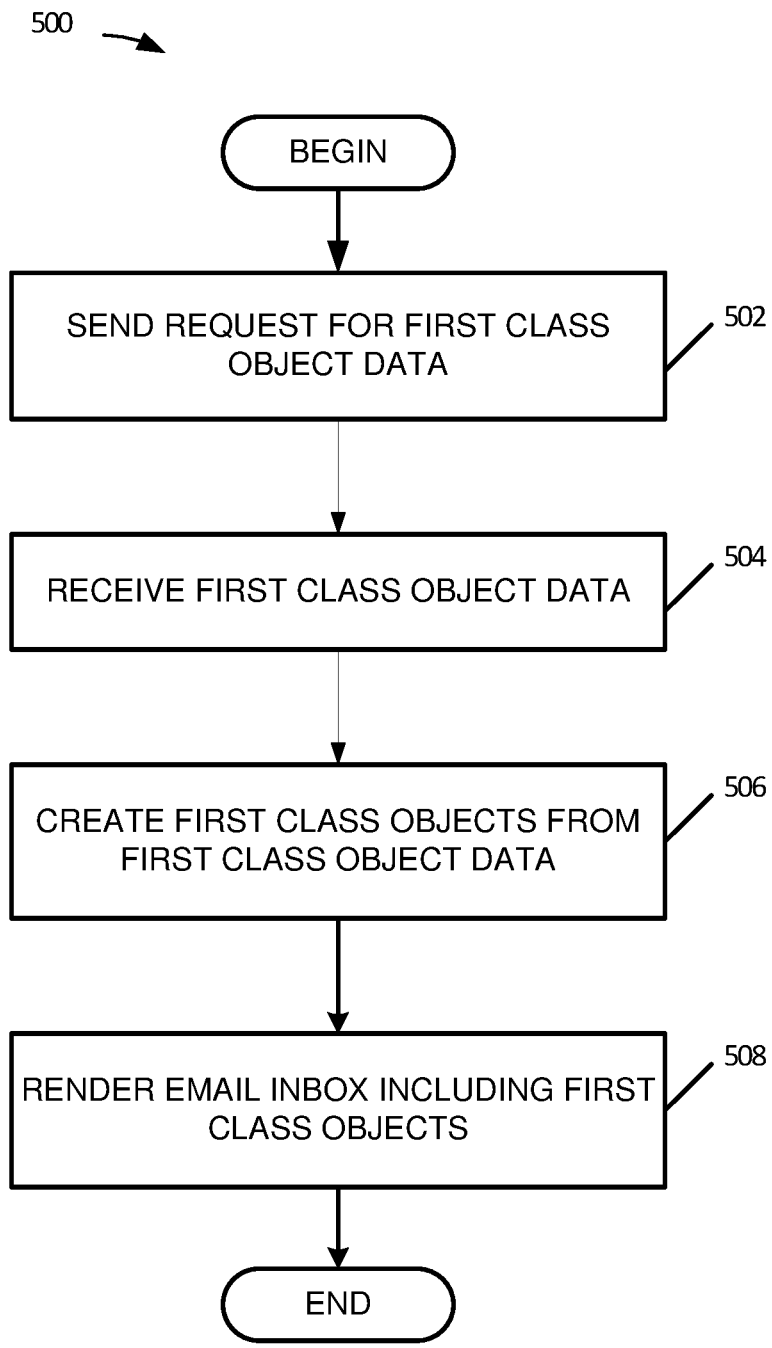
FIG. 5 illustrates an exemplary method for integrating first class objects with email messages in an email inbox of an email client, according to an example aspect.

Referring now to FIG. 5, an exemplary method 500 for integrating first class objects with email messages in an email inbox of an email client, according to an example aspect is shown. Method 500 may be implemented on a computing device or a similar electronic device capable of executing instructions through at least one processor. Method 500 may begin at operation 502, where a request for first class object data is sent, via an email client, to one or more data sources. In one example, the one or more data sources may include data sources such as OneDrive, Skype, Sharepoint, and the like. In another example, the one or more data sources may include local data sources (e.g., data sources located on the client computing device where the email client is located). The request for first class object data may be sent through a different application programming interface (API) for each data source. For example, the email client may call and/or execute an API associated with a first data source to request first class object data from the first data source 130A. In another example, the email client may call and/or execute an API associated with a second data source to request first class object data from the second data source.

When a request for first class object data is sent, via an email client, to one or more data sources, flow proceeds to operation 504 where the first class object data is received at the email client from the one or more data sources. In one example, the email client may receive the first class object data through a different application programming interface for each data source of the one or more data sources. In one example, the first class object data comprises heterogeneous content such as suggested events, calendar events, tasks, to do lists, documents, people, notifications, reminders, notes, phone calls, chat history, third party content, browser tabs, search engine history, third party applications, and the like.

When first class object data is received at the email client from the one or more data sources, flow proceeds to operation 506 where one or more first class objects are created from the first class object data for injecting into an email inbox of the email client. In one example, each first class object of the one or more first class objects comprises a first class object type from a plurality of first class object types. For example, the first class object may be of the first class object type "task". In this example, the first class object is a task. The one or more first class objects may include a common command set. For example, the common command set may include the commands "Do", "Defer", and "Done". In one example, the "Do" command may include a command for initiating an action on the item (e.g., the first class object). For example, when the first class object/item is a document with more than one editor, the "Do" command may initiate a conversation on the document. The "Defer" command may include a command for modifying an item/first class object in the email inbox. For example, the "Defer" command may move an item/first class object in the email inbox to a different position (e.g., a time slot) within the email inbox. The "Done" command may include a command for marking an item/first class object as complete. In one example, the "Done" command may initiate an option for providing feedback.

When one or more first class objects are created from the first class object data for injecting into an email inbox of the email client, flow proceeds to operation 508 where the email inbox including the one or more first class objects are rendered in a user interface to the email client. In one example, the email inbox includes a plurality of email messages and the one or more injected first class objects. The plurality of email messages and the one or more injected first class objects may be ordered in any manner. For example, the email messages may be ordered using standard and conventional email message techniques such as by date, to, from, subject, and the like. In another example, the one or more injected first class objects may be ordered based on first class object type metadata. For example, the email client may process the first class object type metadata to determine one or more positions within the email inbox of the email client for injecting the one or more first class objects. The first class object type metadata may include at least one of a last modified time, a due date, an event start date, a recurring date, a complete date, a time estimate, and an activity date.

Figure 6:
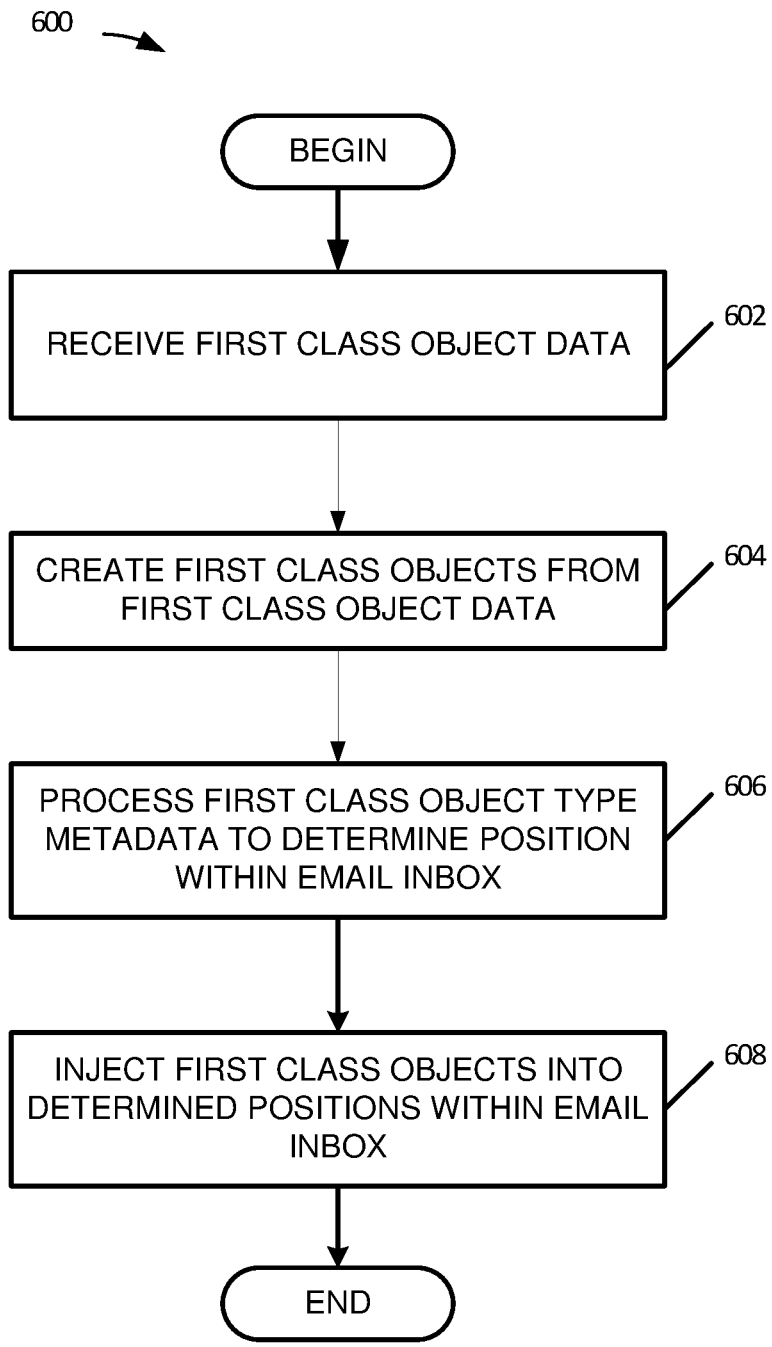
FIG. 6 an exemplary method for ordering first class objects within an email inbox having email messages of an email client, according to an example aspect.

Referring now to FIG. 6, an exemplary method 600 for ordering first class objects within an email inbox having email messages of an email client, according to an example aspect is shown. Method 600 may be implemented on a computing device or a similar electronic device capable of executing instructions through at least one processor. Method 600 may begin at operation 602, where the first class object data is received at the email client from the one or more data sources. In one example, the email client may receive the first class object data through a different application programming interface for each data source of the one or more data sources. In one example, the first class object data comprises heterogeneous content such as suggested events, calendar events, tasks, to do lists, documents, people, notifications, reminders, notes, phone calls, chat history, third party content, browser tabs, search engine history, third party applications, and the like. In some examples, the email messages are received at the email client from an email server. In this example, the email inbox includes the email messages and the one or more injected first class objects.

When the first class object data is received at the email client from the one or more data sources, flow proceeds to operation 604 where one or more first class objects are created from the first class object data. In one example, each first class object comprises a first class object type having first class object type metadata associated with the first class object. In some examples, the first class object type metadata includes at least one of a last modified time, a due date, an event start date, a recurring date, a complete date, a time estimate, and an activity date. The last modified time may include a time at which an item was last modified (e.g., a document, a task, a to-do, a chat conversation, and the like). A due date may include the date and/or time at which an item is due. An event start date may include the start date of an event (e.g., a calendar event and the like). A recurring date may include a date and/or time where a reoccurring action/event takes place. For example, a user may review a particular document every Wednesday morning. A complete date may include the date and/or time that an item is completed. A time estimate may include an amount of time for performing an action associated with the item and/or an amount of time for completing an action associated with the item. For example, when the item/first class object is a document, the time estimate may include an amount of time for reading the document. An activity date may include the date and/or time an activity occurred.

When one or more first class objects are created from the first class object data, flow proceeds to operation 606 where the first class object type metadata is processed to determine one or more positions within an email inbox of the email client for injecting the one or more first class objects. In one example, the one or more determined positions within the email inbox of the email client for injecting the one or more first class objects are based on the processed first class object type metadata. For example, the one or more first class objects may be inserted into a position within the email inbox based on at least one or more of a last modified time, a due date, an event start date, a recurring date, a complete date, a time estimate, and an activity date associated with the first class object.

When the first class object type metadata is processed to determine one or more positions within an email inbox of the email client for injecting the one or more first class objects, flow proceeds to operation 608 where the one or more first class objects are injected into the one or more determined positions within the email inbox of the email client. In one example, the email inbox is rendered in a user interface to the email client. In one example, the one or more determined positions within the email inbox of the email client for injecting the one or more first class objects include future time positions. For example, a determined position may include a position at a time tomorrow, the following day, the following week, and the like.

The term rendering as used herein generally refers to the various capabilities employed in various computing architectures to assemble information that can then be used by other capabilities to generate an image or images. Within the context of methods 500, 600, for example, rendering an email inbox on user interface, for example, generally refers to assembling the information or data used to generate an image or images that together result in the file. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the methods 500, 600, rendering an email inbox on a user interface may refer to generating an image or images, from information assembled for that purpose, that together result in the file, which can then be displayed.

It may also be appreciated that rendering in some scenarios may refer to a combination of the aforementioned possibilities. For example, rendering in some scenarios may refer to both assembling the information used to generate an image or images for a message and then generating the image or images of the message and/or email inbox. In addition, a wide variety of other steps, processes, and stages may occur within the context of presenting an email inbox, all of which may be considered part of presenting an email inbox. Thus, yet one other variation on methods 500, 600 includes, but is not limited to, receiving first class object data, creating one or more first class objects, and presenting an email inbox on a first user interface.

Figure 7:
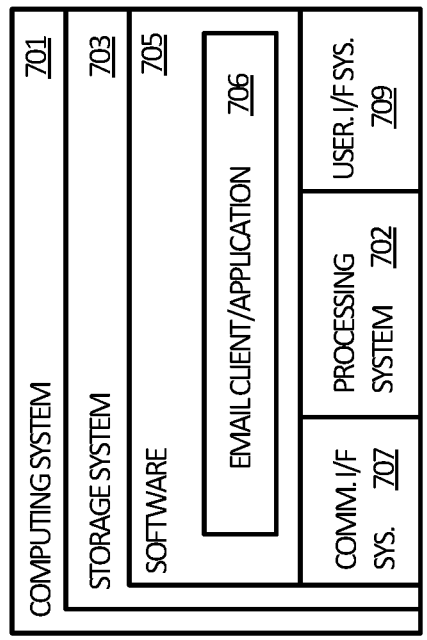
FIG. 7 illustrates a computing system suitable for implementing the enhanced email technology disclosed herein, including any of the environments, architectures, elements, processes, user interfaces, and operational scenarios and sequences illustrated in the Figures and discussed below in the Technical Disclosure.

FIG. 7 illustrates computing system 701 that is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes application 706, which is representative of the email client discussed with respect to the preceding FIGS. 1-6. When executed by processing system 702 to enhance email systems, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced email systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include compliance tool 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced email systems. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: send, via an email client, a request for first class object data to one or more data sources, where each data source of the one or more data sources includes first class object data of a different first class object type; receive, at the email client, the first class object data from the one or more data sources; create one or more first class objects from the first class object data for injecting into an email inbox of the email client; and render the email inbox including at least some of the one or more first class objects and a plurality of email messages in a user interface to the email client. In further examples, the one or more first class objects include a common command set. In further examples, each first class object of the one or more first class objects comprises a first class object type from a plurality of first class object types. In further examples, each first class object type of the plurality of first class object types includes a content type command. In further examples, the computer-implemented method further comprises rendering a reading pane version of at least one first class object in the user interface to the email client.

Further aspects disclosed herein provide an exemplary computer-implemented method for integrating first class objects with email messages in an email inbox of an email client, the method comprising: sending, via the email client, a request for first class object data to one or more data sources; receiving, at the email client, the first class object data from the one or more data sources; creating one or more first class objects from the first class object data for injecting into an email inbox of the email client; and rendering the email inbox including the one or more first class objects in a user interface to the email client. In further examples, each data source of the one or more data sources includes first class object data of a different first class object type. In further examples, the computer-implemented method further comprises receiving, at the email client, email messages from an email server. In further examples, the computer-implemented method further comprises rendering the email inbox including the email messages and the one or more first class objects in the user interface to the email client. In further examples, sending, via the email client, the request for first class object data to one or more data sources comprises sending the request through a different application programming interface for each data source of the one or more data sources. In further examples, receiving, at the email client, the first class object data from the one or more data sources comprises receiving the first class object data through a different application programming interface for each data source of the one or more data sources, and wherein receiving, at the email client, email messages from an email server comprising receiving, at the email client, email messages via simple mail transfer protocol from the email server. In further examples, each first class object of the one or more first class objects comprises a first class object type. In further examples, the first class object type includes at least one of a suggested event, a calendar event, a task, a to do, a document, a person, a notification, a reminder, a note, a phone call, a chat history, third party content, a browser tab, a search engine history, and a third party application.

Additional aspects disclosed herein provide an exemplary device comprising: at least one processor; and memory encoding computer executable instructions that, when executed by the at least one processor, perform a method for ordering first class objects within an email inbox having email messages of an email client, the method comprising: receiving, at an email client, first class object data from the one or more data sources; creating one or more first class objects from the first class object data, where each first class object comprises a first class object type having first class object type metadata associated with the first class object; processing the first class object type metadata to determine one or more positions within an email inbox of the email client for injecting the one or more first class objects; and injecting the one or more first class objects into the one or more determined positions within the email inbox of the email client, where the email inbox is rendered in a user interface to the email client. In further examples, the method further comprising receiving, at the email client, email messages from an email server. In further examples, the email inbox includes the email messages and the one or more injected first class objects. In further examples, the one or more determined positions within the email inbox of the email client for injecting the one or more first class objects are based on the processed first class object type metadata. In further examples, the first class object type metadata includes at least one of a last modified time, a due date, an event start date, a recurring date, a complete date, a time estimate, and an activity date. In further examples, first class object data comprises heterogeneous content. In further examples, the one or more determined positions within the email inbox of the email client for injecting the one or more first class objects include future time positions.

Techniques for integrating first class objects with email messages in an email inbox of an email client are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of email systems that execute in conjunction with an email client application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A computer-implemented method for integrating first class objects with email messages in an email inbox of an email client, the method comprising:
    sending, via the email client, a request for first class object data to one or more data sources;
    receiving, at the email client, the first class object data from the one or more data sources and the email messages from an email server that is distinct from the one or more data sources;
    creating a first class object from the first class object data for injecting into an email inbox of the email client, wherein the first class object comprises a type having a type metadata associated with the first class object;
    processing the type metadata to determine a position within the email inbox of the email client for injecting the first class object; and
    rendering the email inbox including the first class object in a user interface to the email client.

2. The computer-implemented method of claim 1, wherein each data source of the one or more data sources includes first class object data of a different first class object type.

3. The computer-implemented method of claim 1, injecting the first class object into the position within the email inbox of the email client.

4. The computer-implemented method of claim 1, wherein the first class object comprises a command set.

5. The computer-implemented method of claim 1, wherein sending, via the email client, the request for first class object data to one or more data sources comprises sending the request through a different application programming interface for each data source of the one or more data sources.

6. The computer-implemented method of claim 1, wherein receiving, at the email client, the first class object data from the one or more data sources comprises receiving the first class object data through a different application programming interface for each data source of the one or more data sources, and wherein receiving, at the email client, the email messages from the email server comprises receiving, at the email client, the email messages via simple mail transfer protocol from the email server.

7. The computer-implemented method of claim 1, wherein the type metadata includes at least one of a last modified time, a due date, an event start date, a recurring date, a complete date, a time estimate, and an activity date.

8. The computer-implemented method of claim 1, further comprising rendering a reading pane version of at least the first class object in the user interface to the email client.

9. A device comprising:
    at least one processor; and
    memory encoding computer executable instructions that, when executed by the at least one processor, perform a method for ordering first class objects within an email inbox having email messages of an email client, the method comprising:
    receiving, at an email client, first class object data from the one or more data sources and the email messages from an email server that is distinct from the one or more data sources;
    creating one or more first class objects from the first class object data, where each first class object comprises a first class object type having first class object type metadata associated with the first class object;
    processing the first class object type metadata to determine one or more positions within an email inbox of the email client for injecting the one or more first class objects; and
    injecting the one or more first class objects into the one or more determined positions within the email inbox of the email client, where the email inbox is rendered in a user interface to the email client.

10. The device of claim 9, the method further comprising rendering the email inbox including the email messages and the one or more first class objects in the user interface to the email client.

11. The device of claim 10, wherein the email inbox includes the email messages and the one or more injected first class objects.

12. The device of claim 9, wherein the one or more determined positions within the email inbox of the email client for injecting the one or more first class objects are based on the processed first class object type metadata.

13. The device of claim 9, wherein the first class object type metadata includes at least one of a last modified time, a due date, an event start date, a recurring date, a complete date, a time estimate, and an activity date.

14. The device of claim 9, wherein first class object data comprises heterogeneous content.

15. The device of claim 9, wherein the one or more determined positions within the email inbox of the email client for injecting the one or more first class objects include future time positions.

16. A system comprising:
   one or more non-transitory computer readable storage media; and
   program instructions stored on the one or more computer readable storage media that, when executed by at least one processor, cause the at least one processor to at least:
      send, via an email client, a request for first class object data to one or more data sources, where each data source of the one or more data sources includes first class object data of a different first class object type;
      receive, at the email client, the first class object data from the one or more data sources and the email messages from an email server that is distinct from the one or more data sources;
      create one or more first class objects from the first class object data for injecting into an email inbox of the email client, wherein a first class object of the first class objects comprises a type having a type metadata associated with the first class object;
      process the type metadata to determine a position within the email inbox of the email client for injecting the first class object; and
      render the email inbox including at least the first class object and a plurality of email messages in a user interface to the email client.

17. The system of claim 16, wherein the one or more first class objects include a common command set.

18. The system of claim 16, wherein each first class object of the one or more first class objects comprises a first class object type from a plurality of first class object types.

19. The system of claim 18, wherein each first class object type of the plurality of first class object types includes a content type command.

20. The system of claim 16, wherein the first class object type includes at least one of a suggested event, a calendar event, a task, a to do, a document, a person, a notification, a reminder, a note, a phone call, a chat history, third party content, a browser tab, a search engine history, and a third party application.

\* \* \* \* \*